(12) United States Patent
Gibson

(10) Patent No.: US 10,927,621 B2
(45) Date of Patent: Feb. 23, 2021

(54) SOIL AND MUD CUTTINGS REMEDIATION SYSTEM AND METHOD

(71) Applicant: Michael Charles Gibson, Spring, TX (US)

(72) Inventor: Michael Charles Gibson, Spring, TX (US)

(*) Notice: Subject to any disclaimer, the term of this patent is extended or adjusted under 35 U.S.C. 154(b) by 483 days.

(21) Appl. No.: 15/360,765

(22) Filed: Nov. 23, 2016

(65) Prior Publication Data

US 2017/0145762 A1    May 25, 2017

Related U.S. Application Data

(60) Provisional application No. 62/259,865, filed on Nov. 25, 2015.

(51) Int. Cl.
| | | |
|---|---|---|
| *E21B 21/06* | (2006.01) | |
| *B09B 3/00* | (2006.01) | |
| *B09C 1/08* | (2006.01) | |
| *B09C 1/10* | (2006.01) | |

(52) U.S. Cl.
CPC .............. *E21B 21/066* (2013.01); *B09B 3/00* (2013.01); *B09C 1/08* (2013.01); *B09C 1/10* (2013.01)

(58) Field of Classification Search
CPC .......... E21B 21/066; B09B 3/00; B09C 1/08; B09C 1/10
See application file for complete search history.

(56) References Cited

U.S. PATENT DOCUMENTS

| | | | | |
|---|---|---|---|---|
| 5,368,411 A | * | 11/1994 | Losack | B09C 1/02 134/40 |
| 5,593,888 A | * | 1/1997 | Glaze | B01F 3/06 241/1 |
| 2003/0098189 A1 | * | 5/2003 | Donohue | B60K 6/40 180/65.25 |
| 2015/0027926 A1 | * | 1/2015 | Goldman | C10G 33/04 208/188 |

OTHER PUBLICATIONS

Chen, Pilot tests of microbe-soil combined treatment of waste drilling sludge, Natural Gas Industry B 2 pp. 270-273 (Year: 2015).*
Singh, Vinod; et al. "Microemulsions as Promising Delivery Systems: A Review" Indian Journal of Pharmaceutical Education and Research, Oct.-Dec. 2011/ vol. 45/ Issue 4 pp. 392-401 (Year: 2011).*

* cited by examiner

*Primary Examiner* — William H. Beisner
*Assistant Examiner* — Danielle B Henkel
(74) *Attorney, Agent, or Firm* — Adolph Locklar

(57) ABSTRACT

A method of remediation is disclosed. The method may include combining mud cuttings with bacteria-containing soil and water to form a feed mixture. The mud cuttings include a hydrocarbon. The method further includes combining the feed mixture with a surfactant blend containing a surfactant to form a feed/surfactant mixture and shearing the feed/surfactant mixture to form a micro-emulsion. The method may also include reducing the hydrocarbon content of the mud cuttings to form disposable cuttings.

20 Claims, 4 Drawing Sheets

SOIL AND MUD CUTTINGS REMEDIATION SYSTEM AND METHOD

CROSS-REFERENCE TO RELATED APPLICATIONS

This application is a non-provisional which claims priority from U.S. Provisional Application No. 62/259,865, filed Nov. 25, 2015, which is incorporated by reference herein in its entirety.

FIELD

Embodiments of the present disclosure generally relate to systems and methods for the remediation of hydrocarbon containing materials. More particularly, the present disclosure relates to systems and methods for the biological remediation of hydrocarbon-containing soils and mud cuttings.

BACKGROUND

In traditional oil and gas wells, a drilling fluid, often termed "drilling mud", is pumped down through the drill pipe and through the drill bit. The drilling mud is returned to the surface through the annulus between the drill pipe and the inner surface of the borehole. As the drill bit cuts into the earth, the drill cuttings are carried by the drilling mud to the surface. Drilling mud cools and lubricates the drill bit and removes the drill cuttings from the borehole. Drill cuttings conventionally are removed from the drilling mud through equipment, such as shale shakers. In addition, in certain conventional mud systems, waste mud containing mud cuttings may be stored in reserve mud pits.

Once separated from the drilling mud, drill cuttings are then disposed of as waste. Drill cuttings may include hydrocarbons including the base hydrocarbon from oil-based muds, formation hydrocarbons and other hydrocarbons added to the drilling mud for lubrication or other purposes. Hydrocarbon-containing drill cuttings may present a waste problem for operators. Conventionally, hydrocarbon-containing drill cuttings have been diluted by mixing with soil and disposed of in landfills.

SUMMARY

A method of remediation is disclosed. The method includes combining mud cuttings with bacteria-containing soil and water to form a feed mixture. The mud cuttings include a hydrocarbon. The method includes combining the feed mixture with a surfactant blend containing a surfactant to form a feed/surfactant mixture. The method includes shearing the feed/surfactant mixture to form a micro-emulsion. The method includes reducing a hydrocarbon content of the mud cuttings to form disposable cuttings.

Another method of remediation is disclosed. The method includes combining mud cuttings with water to form a feed mixture. The mud cuttings include a hydrocarbon. The method includes combining the feed mixture with a surfactant blend containing a surfactant to form a feed/surfactant mixture. The method includes shearing the feed/surfactant mixture to form a micro-emulsion. The method includes reducing a hydrocarbon content of the mud cuttings to form disposable cuttings in a containment reservoir. Soil is not added to the method of remediation.

Yet another method of remediation is disclosed. The method includes introducing a surfactant blend and fresh soil to a waste mud containing hydrocarbons in a mud pit to form a waste mud/surfactant blend/fresh soil mixture. The method includes agitating the waste mud/surfactant blend/fresh soil mixture to form a micro-emulsion. The method includes reducing an amount of hydrocarbons in the waste mud to form disposable cuttings. The method includes removing the disposable cuttings from the mud pit.

BRIEF DESCRIPTION OF DRAWINGS

The present disclosure may be understood from the following detailed description when read with the accompanying figures.

DETAILED DESCRIPTION

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Figure 1:
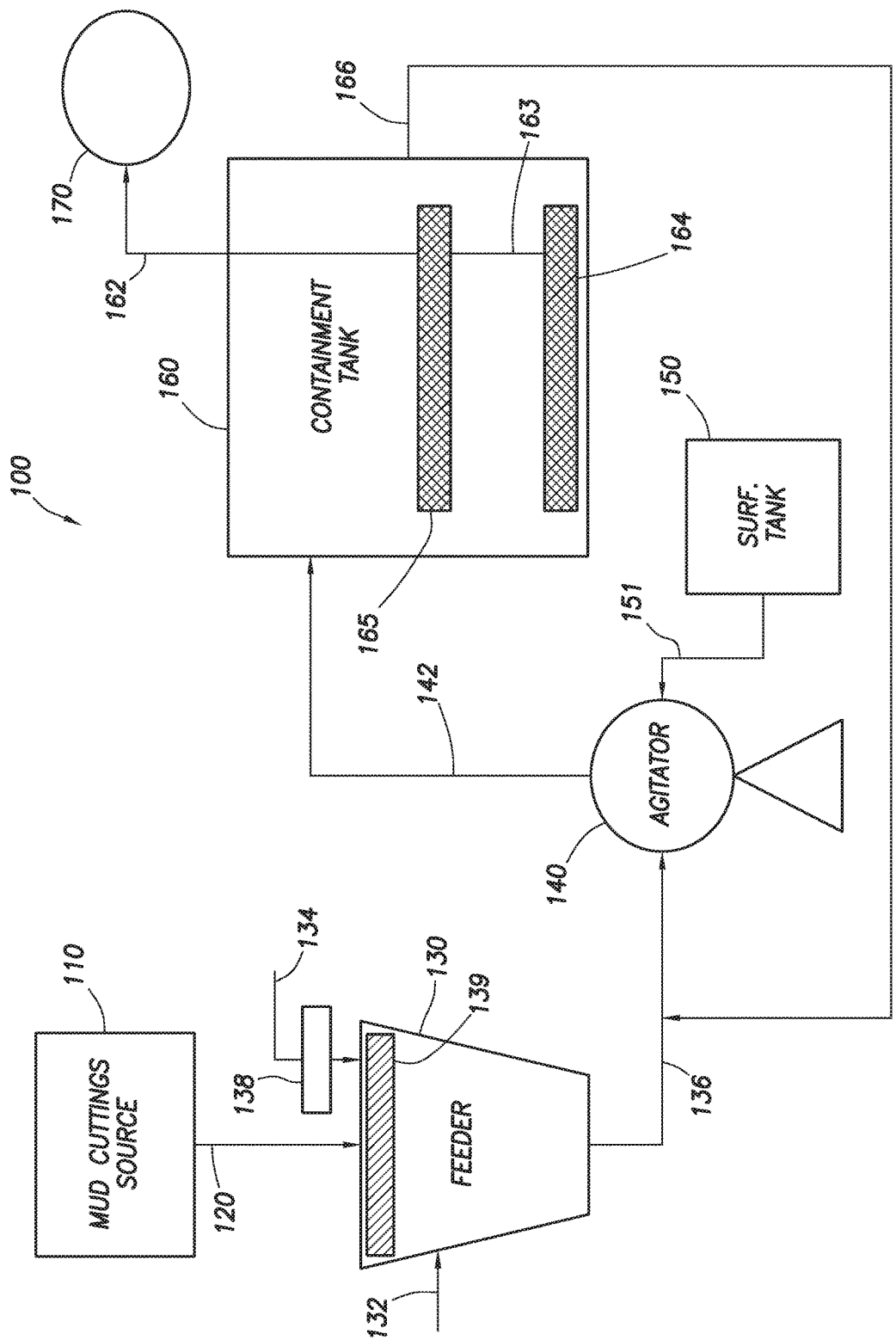
FIG. 1 is a block diagram of a remediation system in accordance with certain embodiments of the present disclosure.

FIG. 1 is a block diagram of remediation system 100. Remediation system 100 includes mud cuttings source 110. Mud cuttings source 110 may include, but is not limited to, a shale shaker, temporary mud cutting storage, such as a roll off box or mud waste cuttings pile, a reserve mud pit, waste mud storage, or waste mud system. Mud cuttings source 110 may deliver the mud cuttings to feeder 130 through mud cuttings delivery 120. Mud cuttings delivery 120 may vary depending on mud cuttings source 110. For instance, when mud cuttings source 110 is a shale shaker, mud cuttings delivery 120 may be a chute, vibrating tray, or conveyor belt. When mud cuttings source 110 is temporary mud cutting storage, mud cuttings delivery 120 may be an excavator or other earth moving equipment. When mud cuttings source 110 is a reserve mud pit, waste mud storage, or waste mud system, mud cuttings delivery 120 may be piping.

Mud cuttings may include between 3% and 20%, or between 5% and 15% or between 7% and 12% by weight hydrocarbons, although these amounts are non-limiting.

Feeder 130 is adapted to receive mud cuttings and other materials, including, for instance, water, soil, microbes, oxygen, or combinations thereof and form a feed mixture. In certain embodiments of the present disclosure, feeder 130 is open to the atmosphere, such as a hopper. In other embodiments, feeder 130 is closed to the atmosphere. In the embodiment shown in FIG. 1, water may be introduced into feeder 130 through water feed 132. The water in water feed 132 may be fresh water, including potable or non-potable water, or water with high total dissolved solids, such as salt water. Soil may be added to feeder 130 through soil feed 134. In certain embodiments, soil contains indigenous hydrocarbon-consuming microbes, such as bacteria. Soil may include sand or may consist of soil uncontaminated with hydrocarbons sourced nearby the well. In some embodiments, the bacteria are aerobic bacteria.

In certain embodiments, the soil in soil feed 134 may include undesirable components such as rocks, clumps of soil, pieces of wood, or other detritus. Such undesirable components may clog downstream equipment, such as feeder 130 or agitator 140. In these embodiments, it may be desirable to include crusher 138 in soil feed 134, as shown in FIG. 1. Crusher 138 may include or consist of any mechanical devices designed to reduce the size of the undesirable components to reduce the likelihood of clogging the downstream equipment. Examples of crusher 138 may include a rock crusher, such as the MUFFIN MONSTER® manufactured by JWC ENVIRONMENTAL®. Crusher 138 may be located in soil feed 134, as shown in FIG. 1, within feeder 130, or in a combined mud cuttings delivery 120/soil feed 134 stream. In certain embodiments, water feed 132 may also be combined with soil feed 134 prior to introduction to crusher 138.

In some embodiments of the present disclosure, feeder 130 may further include screen 139. Screen 139 may be adapted to prevent rocks, clumps of soil, pieces of wood, or other detritus from entering feeder 130 and/or from proceeding through feeder 130 to clog downstream equipment, such as agitator 140. FIG. 1 depicts screen 139 at the top of feeder 130, although one of ordinary skill in the art will appreciate that screen 139 may be located at any position within or on top of feeder 130.

The feed mixture may be removed from feeder 130 through agitator feed line 136 to agitator 140. The motive force for transferring the feed mixture through agitator feed line 136 may be gravity, although a pump such as a slurry pump or an auger may be used in lieu of or in addition to gravity. In certain embodiments, agitator 140 may be located beneath feeder 130. In some embodiments, agitator 140 may abut feeder 130.

Agitator 140 may be adapted to combine the feed mixture with a surfactant blend and shear the resulting feed mixture/surfactant blend into a micro-emulsion. The micro-emulsion may increase the surface area of the hydrocarbon available for contact with the microbe. Agitator 140 may be a high shear in-line mixer or a high shear pump, for example. In certain embodiments, the surfactant blend is fed from surfactant tank 150 through surfactant feed 151 into agitator 140. In other embodiments, the surfactant blend may be introduced into agitator feed line 136 prior to agitator 140. Surfactant tank 150 may be, for instance, a bulk tank, tote or a drum. The surfactant blend may include any surfactant capable of forming a mud/water/hydrocarbon micro-emulsion. Examples of such surfactants include ethoxylated octylphenolic surfactants (also known as octylphenol ethoxylates) and blends of ethoxylated octylphenolic surfactants. In certain embodiments, the ethoxylated octylphenolic surfactant may have the following structure:

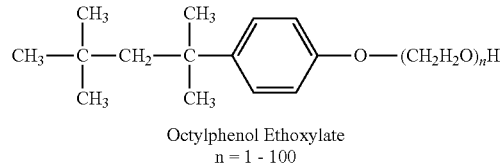

Octylphenol Ethoxylate
n = 1 - 100

As one of ordinary skill in the art will appreciate with the benefit of this disclosure, the above structure is exemplary and non-limiting. In certain embodiments, branching of the octyl group may result in additional structural isomers that are within the scope of "ethoxylated octylphenolic surfactants."

Ethoxylated octylphenolic surfactants may be produced by the based-catalyzed reaction of para-octylphenol (p-OP) with ethylene oxide (EO). The products of this reaction are polymers with varying levels of ethoxylation and may be distributed in a normal curve around a target ethoxylation level. Commercially available ethoxylated octylphenolic surfactants generally range from 4 moles of ethoxylation (OPE4) to 80 moles of ethoxylates (OPE80).

Examples of ethoylated octylphenolic surfactants include, but are not limited to, polyethylene glycol octylphenol ether (CAS RN 9002-93-1), ethoxylated octylphenol (CAS RN 9036-19-5), and poly (oxy-1,2-ethanediyl), alpha-(octylphenyl)-omega-hydroxy-branched (CAS RN 68987-90-6).

The surfactant blend may include an anionic hydrotrope and a solubilizing agent. The anionic hydrotrope may be between 0.5% and 5%, or between about 1% and 2% of the surfactant blend by weight. Similarly, the solubilizing agent may be between 0.5% and 5%, or between about 1% and 2% of the surfactant blend by weight.

The micro-emulsion may include, for example, from 1 to 50% surfactant blend, 2 to 25% surfactant blend, or 5 to 10% surfactant blend, by weight. The micro-emulsion may further include between 1 and 25% hydrocarbons, 3-10% hydrocarbons, or 4-8% hydrocarbons. The remainder of the micro-emulsion may include soil, mud cuttings, and water.

Without being bound by theory, non-ionic surfactants may physically react to form micelles and may therefore solubilize a wide range of organics. The non-ionic surfactants may provide varying hydrophilic lipophilic balances with commensurate varying ethoxy units in the ethoxylate moieties. The working concentration of the non-ionic surfactant may be chosen to be in excess of the critical micelle concentration for the solution and, as such, solubility of hydrocarbon substrate may be achieved. The blending of the non-ionic surfactants into an aqueous solution and stabilization of the cloud point may be assisted through the use of the anionic hydrotrope and solubilizing agent.

The micro-emulsion may be removed from agitator 140 through agitator discharge line 142. In certain embodiments, such as that shown in FIG. 1, agitator discharge line 142 may carry the micro-emulsion to containment tank 160. Containment tank 160 may be adapted to allow the microbes in the micro-emulsion to break down the hydrocarbon to, for instance, water and carbon dioxide to a pre-determined micro-emulsion hydrocarbon concentration or to where no free oil is visible on the surface of the micro-emulsion. The pre-determined concentration of hydrocarbons may be less than 5%, less than 3%, less than 1% or less than 0.5% of the micro-emulsion, by weight. In some embodiments, containment tank 160 may be sized to provide an average residence time for hydrocarbons in containment tank 160 of from 0.5 to 5 days, or 1 to 2 days.

Further, as the micro-emulsion remains in containment tank 160, mud cuttings may settle from the micro-emulsion to the bottom of containment tank 160. Containment tank 160 may be a tank, tote, or other covered or uncovered vessel adapted to hold the micro-emulsion.

In the embodiment shown in FIG. 1, a portion of the micro-emulsion may be removed from containment tank 160 to agitator feed line 136 through recirculation line 166. FIG. 1 also depicts mud cuttings discharge 162. Mud cuttings discharge 162 removes mud cuttings that have sunk to the bottom of containment tank 160, termed disposable cuttings. In certain embodiments, mud cuttings discharge 162 may be an auger.

In certain embodiments, containment tank 160 may include bottom auger 164. Bottom auger 164 may circulate the micro-emulsion in containment tank 160 and/or move the disposable cuttings to discharge inlet 163 of mud cuttings discharge 162. Bottom auger 164 may be located at or near the bottom of containment tank 160. In other embodiments, containment tank 160 may include circulator 165. Circulator 165 may be adapted to circulate the micro-emulsion within containment tank 160. Circulator 165 may be an auger, blade, bubble circulator, or any other device known in the art to circulate liquids within a tank.

Mud cuttings discharge 162 may discharge disposable cuttings to containment reservoir 170. Containment reservoir 170 may be a lined or unlined pit, a containment basin, or an area on the ground or soil (in-situ treatment). As one of ordinary skill in the art with the benefit of this disclosure will appreciate, containment reservoir 170 may be closed. Containment reservoir 170 may retain disposable cuttings until the microbes introduced from the fresh soil have reduced the hydrocarbon content of the disposable cuttings to a predetermined level. The predetermined level of the hydrocarbon may be less than 5%, less than 3%, less than 1% or less than 0.5% hydrocarbons, by weight.

Remediation system 100 may be operated in batch or continuous mode.

In another embodiment remediation system may be adapted to reclaim the hydrocarbons rather than convert the hydrocarbons to carbon dioxide and water. In such embodiments, soil and/or microbes are not added to mud cuttings. In these embodiments, a skimmer may be included in containment tank 160. The skimmer may remove hydrocarbons that float to the top of the liquid in containment tank 160. The skimmer may operate intermittently or continuously.

In some embodiments, the surfactant blend and fresh soil may be added to a waste mud, such as in a mud pit. The waste mud, surfactant blend, and fresh soil may be agitated to form a micro-emulsion. An example of such an agitator is an axial or transverse mixer sold by Alpine Sales & Rental Corp. Mud cuttings may sink to the bottom of the mud pit and be removed as disposable cuttings, such as by an excavator or other earth moving equipment. In these embodiments, the mud cuttings may be removed such as when there is no visible sheen of oil on the surface of the liquid or after the liquid reaches a certain percentage of residual hydrocarbons.

Figure 2:
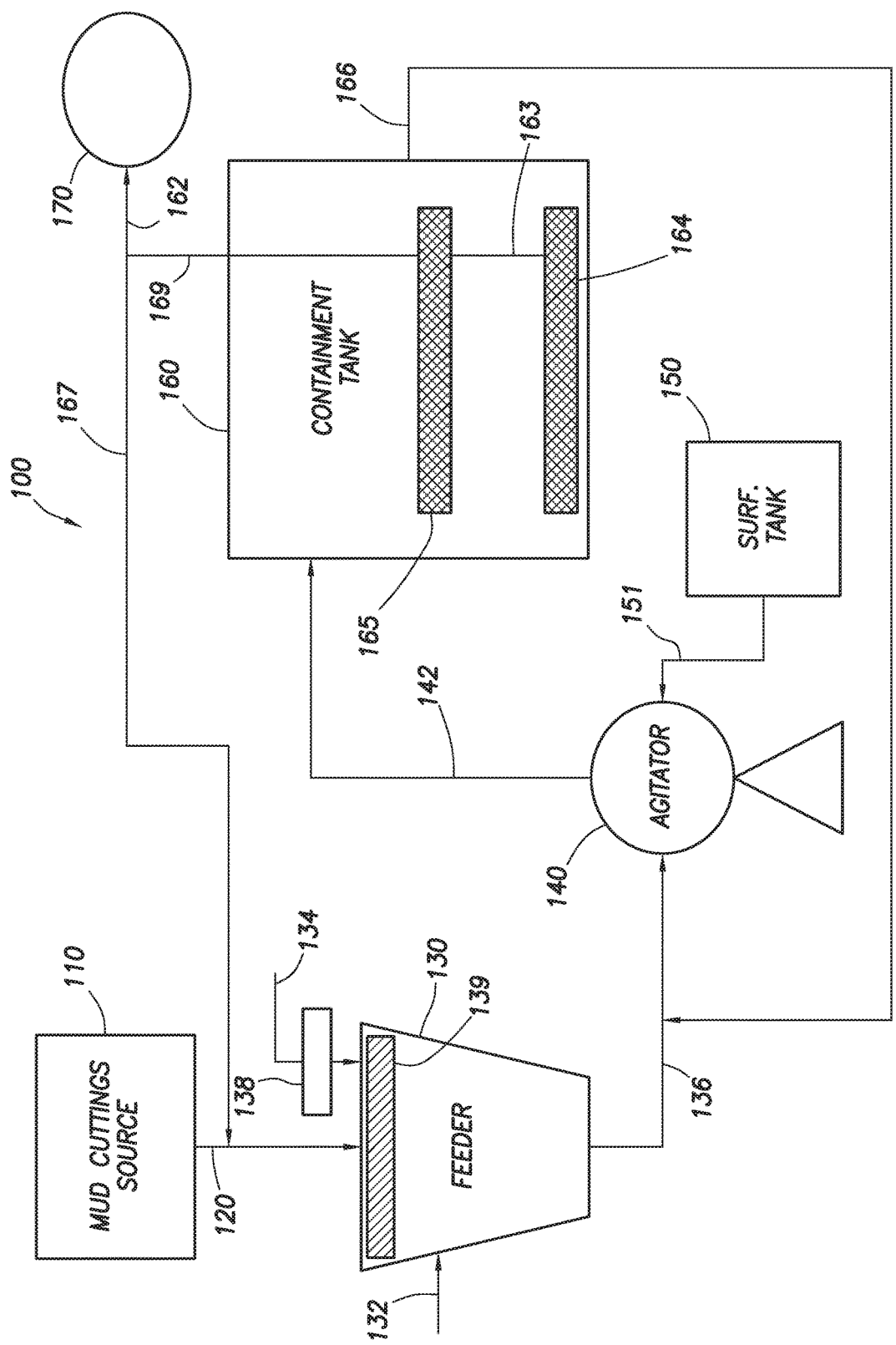
FIG. 2 is a block diagram of a remediation system in accordance with certain embodiments of the present disclosure.

FIG. 2 depicts an alternative embodiment of remediation system 100. As depicted in FIG. 2, remediation system 100 is operated in a batch mode. A predetermined amount of mud cuttings from mud cuttings source 110, a predetermined amount of fresh soil from soil feed 134, and a predetermined amount of water from water feed 132 may be added to feeder 130. A portion of micro-emulsion may be recirculated to agitator feed line 136 through recirculation line 166. The micro-emulsion recirculation through recirculation line 166 may serve to reduce the amount of ethoxylated octylphenolic surfactant used in remediation system 100 compared to when the micro-emulsion is not recirculated. During treatment mode, mud cuttings from discharge inlet 163 are fed to cuttings discharge 169. The mud cuttings in cuttings discharge 169 are fed to feeder 130 through mud cuttings feed line 167 during treatment mode. Thus, during treatment mode, both mud cuttings and the micro-emulsion are recirculated from containment tank 160 and combined in agitator 140. After a predetermined time, the mud cuttings in cuttings discharge 169 are transferred to containment reservoir 170 through mud cuttings discharge 162.

Figure 3:
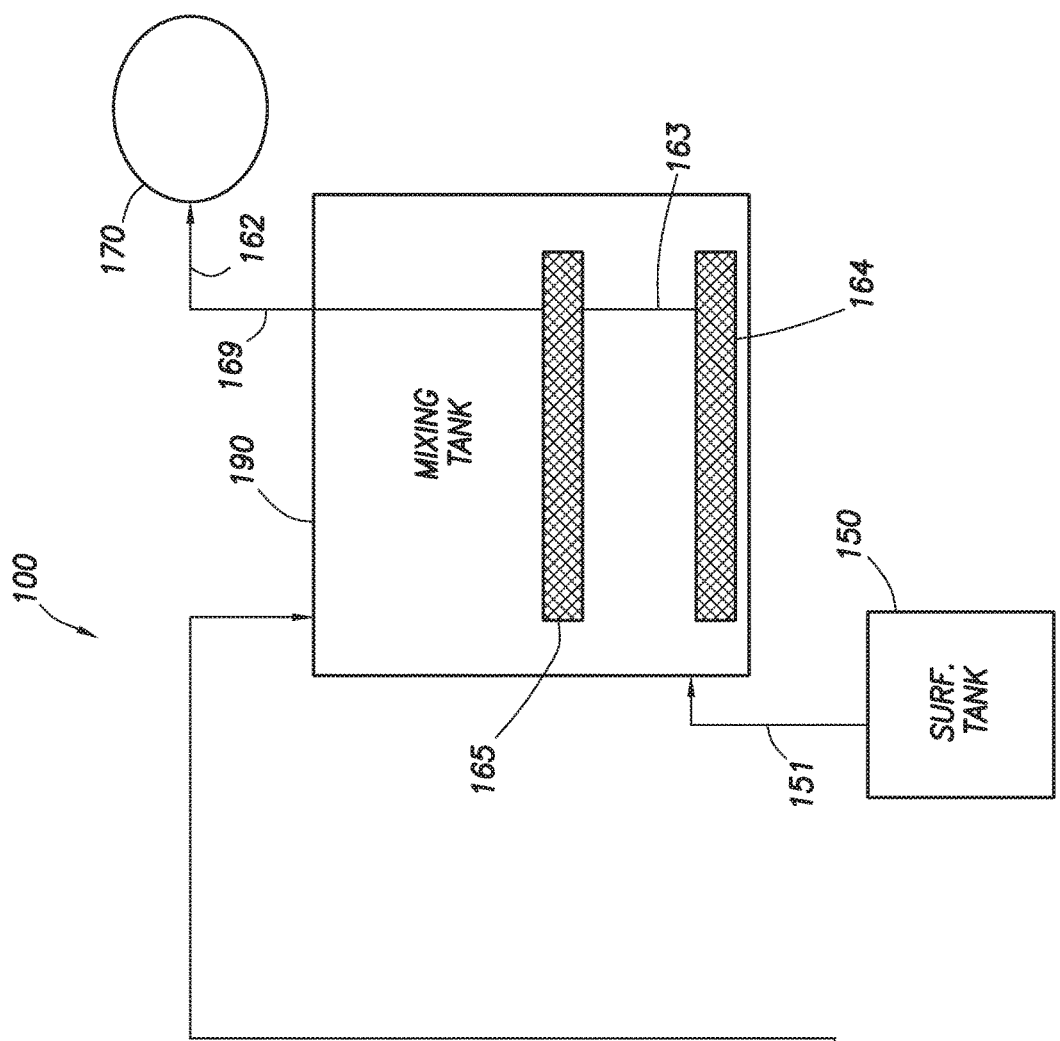
FIG. 3 is a block diagram of a remediation system in accordance with certain embodiments of the present disclosure.
Figure 3:
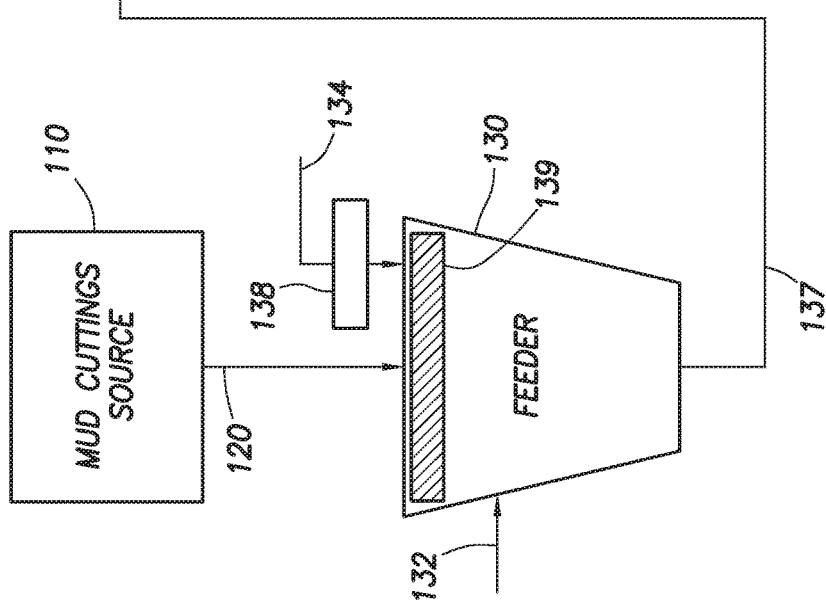

FIG. 3 depicts another alternative embodiment of remediation system 100. In FIG. 3, remediation system 100 includes mud cuttings source 110. Mud cuttings source 110 may deliver the mud cuttings to feeder 130 through mud cuttings delivery 120. In the embodiment shown in FIG. 3, water may be introduced into feeder 130 through water feed 132. Soil may be added to feeder 130 through soil feed 134. In certain embodiments, the soil in soil feed 134 may include undesirable components such as rocks, clumps of soil, pieces of wood, or other detritus. Such undesirable components may clog downstream equipment, such as feeder 130. In these embodiments, it may be desirable to include crusher 138 in soil feed 134, as shown in FIG. 3. Crusher 138 may include or consist of any mechanical devices designed to reduce the size of the undesirable components to reduce the likelihood of clogging the downstream equipment. Crusher 138 may be located in soil feed 134, as shown in FIG. 3, within feeder 130, or in a combined mud cuttings delivery 120/soil feed 134 stream. In certain embodiments, water feed 132 may also be combined with soil feed 134 prior to introduction to crusher 138.

FIG. 3 further depicts screen 139. Screen 139 may be adapted to prevent rocks, clumps of soil, pieces of wood, or other detritus from entering feeder 130 and/or from proceeding through feeder 130 to clog downstream equipment, such as mixing tank 190. FIG. 3 depicts screen 139 at the top of feeder 130, although one of ordinary skill in the art will appreciate that screen 139 may be located at any position within or on top of feeder 130.

The feed mixture may be removed from feeder 130 through mixing tank feed line 137 to mixing tank 190 where it may be combined with surfactant from surfactant tank 150 through surfactant feed 151. Mixing tank 190 may be any tank adapted to mix the feed mixture with the surfactant to form an emulsion. In certain embodiments, mixing tank 190 is a frac tank.

FIG. 3 also depicts mud cuttings discharge 162. Mud cuttings discharge 162 removes mud cuttings that have sunk to the bottom of mixing tank 190, termed disposable cuttings. In certain embodiments, mud cuttings discharge 162 may be an auger.

In certain embodiments, mixing tank 190 may include bottom auger 164. Bottom auger 164 may circulate the micro-emulsion in mixing tank 190 and/or move the disposable cuttings to discharge inlet 163 of mud cuttings discharge 162. Bottom auger 164 may be located at or near the bottom of mixing tank 190. In other embodiments, mixing tank 190 may include circulator 165. Circulator 165 may be adapted to circulate the micro-emulsion within mixing tank 190. Circulator 165 may be an auger, blade, bubble circulator, or any other device known in the art to circulate liquids within a tank.

Mud cuttings discharge 162 may discharge disposable cuttings to containment reservoir 170. Containment reservoir 170 may be a lined or unlined pit, a containment basin, or an area on the ground or soil (in-situ treatment). Although as one of ordinary skill in the art with the benefit of this disclosure will appreciate, containment reservoir 170 may be closed. Containment reservoir 170 may retain disposable cuttings until the microbes introduced from the fresh soil have reduced the hydrocarbon content of the disposable cuttings to a predetermined level. The predetermined level of the hydrocarbon may be less than 5%, less than 3%, less than 1% or less than 0.5% hydrocarbons, by weight.

Figure 4:
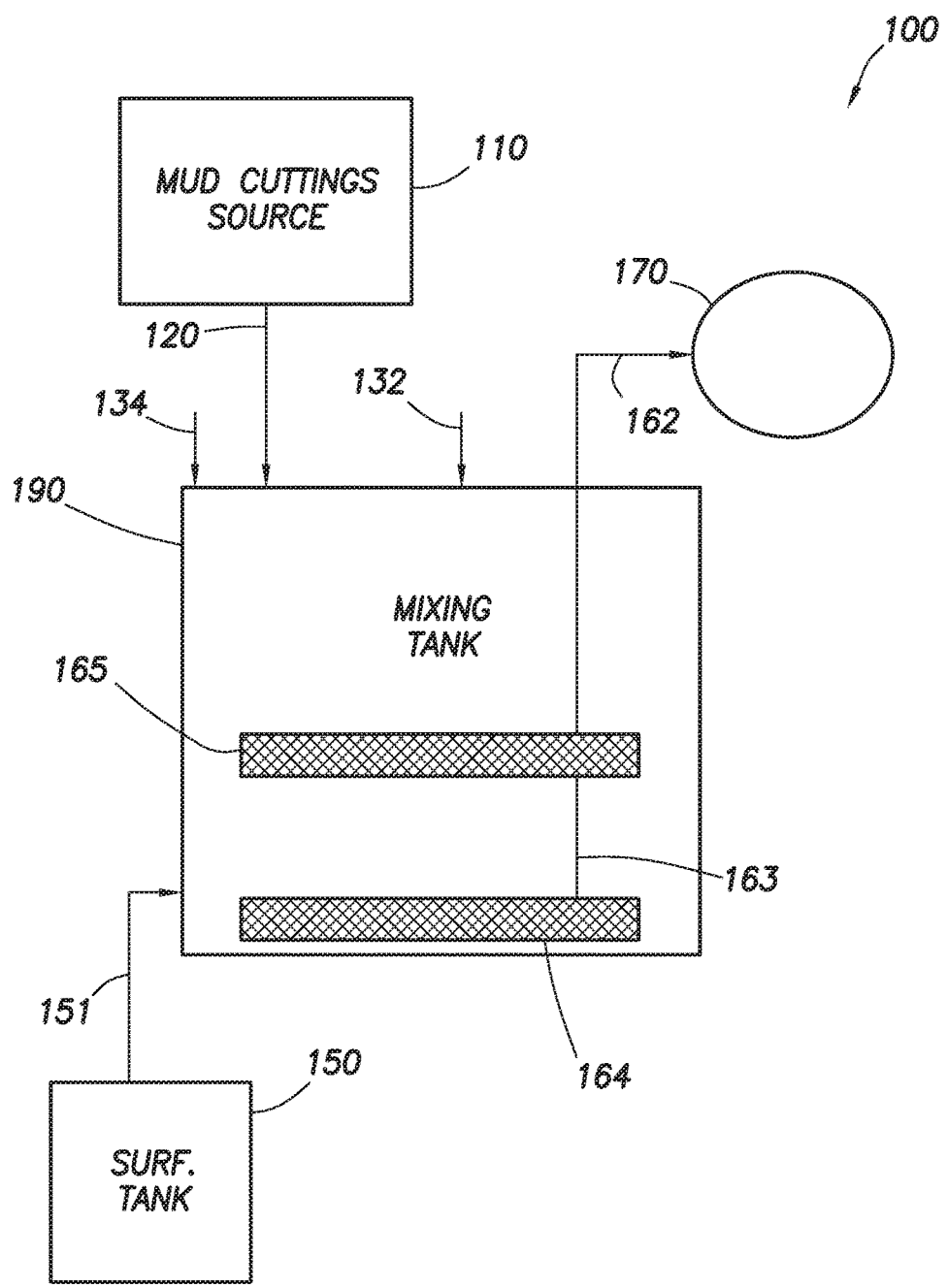
FIG. 4 is a block diagram of a remediation system in accordance with certain embodiments of the present disclosure.

FIG. 4 depicts yet another alternative embodiment of remediation system 100. In FIG. 4, mud cuttings source 110 is fed directly to mixing tank 190 through mud cuttings delivery 120. Water may be added to mixing tank 190 through water feed 132. Soil may be added to mixing tank 190 through soil feed 134. Although shown as separate feeds, any two or all of mud cuttings delivery 120, water feed 132 and soil feed 134 may be combined and fed to mixing tank 190.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A method of remediation comprising:
combining mud cuttings with indigenous bacteria-containing soil and water to form a feed mixture, the mud cuttings including a hydrocarbon;
shearing the feed mixture with a surfactant blend containing a surfactant to form a feed/surfactant mixture;
mixing the feed/surfactant mixture to form a micro-emulsion and
reducing a hydrocarbon content of the mud cuttings.

2. The method of claim 1, wherein the surfactant blend comprises ethoxylated octylphenolic surfactants.

3. The method of claim 2, wherein the surfactant blend comprises an anionic hydrotrope.

4. The method of claim 3, wherein the micro-emulsion comprises between 0.5 and 2% of anionic hydrotrope by weight.

5. The method of claim 2, wherein the surfactant blend comprises a solubilizing agent.

6. The method of claim 5, wherein the micro-emulsion comprises between 0.5 and 5% of the solubilizing agent by weight.

7. The method of claim 2, wherein the micro-emulsion comprises between 1 and 25% hydrocarbons, by weight.

8. The method of claim 2, wherein the micro-emulsion comprises between 2 to 25% surfactant blend by weight.

9. The method of claim 1, wherein the water is fresh water or salt water.

10. The method of claim 1, wherein combining the mud cuttings with the bacteria-containing soil and the water to form the feed mixture is performed in a hopper open to the air.

11. The method of claim 1, wherein the mud cuttings are sourced from a shale shaker, roll-off box, mud waste cuttings pile, reserve mud pit, or waste mud storage.

12. The method of claim 1, wherein the step of mixing the feed/surfactant mixture is performed by a high-shear in-line mixer or high-shear pump.

13. The method of claim 1, wherein after the step of reducing a hydrocarbon content of the mud cuttings, the mud cuttings comprise less than 1% hydrocarbons by weight.

14. The method of claim 1, wherein the step of reducing the hydrocarbon content of the mud cuttings is performed in a containment reservoir, wherein the containment reservoir is a lined or unlined pit, a containment basin, or an area on ground or soil.

15. The method of claim 14, further comprising after the step of reducing a hydrocarbon content of the mud cuttings:
removing the mud cuttings from the containment reservoir.

16. The method of claim 15, wherein the step of removing the mud cuttings from the containment reservoir is performed by an auger or an excavator.

17. A method of remediation comprising:
introducing a surfactant blend, water, and fresh soil having indigenous bacteria to a waste mud comprising hydrocarbons in a mud pit to form a waste mud/surfactant blend/fresh soil/water mixture, wherein the surfactant blend consists of a surfactant, and optionally a solubilizing agent or an anionic hydrotrope;
shearing the waste mud/surfactant blend/fresh soil/water mixture to form a micro-emulsion in the mud pit; and
reducing an amount of hydrocarbons in the waste mud in the mud pit.

18. The method of claim 1 further comprising after the step of reducing a hydrocarbon content of the mud cuttings:
discharging the mud cuttings to a containment reservoir.

19. The method of claim 18, wherein the containment reservoir is a lined or unlined pit, a containment basin, or an area on the ground or soil.

20. The method of claim 18 further comprising retaining the waste mud in the containment reservoir until the hydrocarbon content is less than 1%.

* * * * *